United States Patent
Ando

[11] Patent Number: 6,079,534
[45] Date of Patent: Jun. 27, 2000

[54] ONE-WAY CLUTCH

[75] Inventor: Tomoharu Ando, Fukuroi, Japan

[73] Assignee: NSK-Warner K.K., Tokyo, Japan

[21] Appl. No.: 08/992,790

[22] Filed: Dec. 18, 1997

[30] Foreign Application Priority Data

Dec. 25, 1996 [JP] Japan .................................. 8-359836

[51] Int. Cl.$^7$ .............................................. F16D 41/07
[52] U.S. Cl. .................................... 192/45.1; 192/110 B
[58] Field of Search .............................. 192/45.1, 41 A, 192/110 B

[56] References Cited

U.S. PATENT DOCUMENTS

| | | | |
|---|---|---|---|
| 2,364,280 | 12/1944 | Dodge | 192/45.1 |
| 2,366,842 | 1/1945 | Dodge et al. | 192/45.1 |
| 2,633,952 | 4/1953 | Zeidler | 192/45.1 |
| 2,795,308 | 6/1957 | Hayden | 192/45.1 |
| 2,803,324 | 8/1957 | Dodge | 192/45.1 |
| 3,730,316 | 5/1973 | Zimmer | 192/45.1 X |

FOREIGN PATENT DOCUMENTS 63-31011 6/1988 Japan .

*Primary Examiner*—Rodney H. Bonck
*Attorney, Agent, or Firm*—Vorys, Sater, Seymour and Pease LLP

[57] ABSTRACT

A one-way clutch has an outer race and an inner race radially spaced apart from each other and concentrically disposed for rotation relative to each other, the outer race having an inner peripheral raceway surface, the inner race being disposed within the outer race and having an annular outer peripheral raceway surface, a plurality of cam type sprags disposed between the outer race and the inner race for transmitting a torque between the outer peripheral raceway surface and the inner peripheral raceway surface, an annular retainer for retaining the sprags, and a spring member for sandwiching the sprags between itself and the retainer and biasing the sprags in a meshing direction. The one-way clutch is further provided with bearings disposed in a circumferential direction among the cam type sprags and frictionally sliding on the inner peripheral surface of the outer race and the outer peripheral surface of the inner race.

5 Claims, 5 Drawing Sheets

ONE-WAY CLUTCH

BACKGROUND OF THE INVENTION

1. Field of the Invention

This invention relates to a one-way clutch of the single gauge type for use in the transmission or the like of an automobile, an agricultural machine or a construction machine or the like. More particularly, it relates to a one-way clutch in which a block bearing is disposed between cam type sprags in a circumferential direction.

2. Related Background Art

In a one-way clutch of the sprag type according to the prior art, as shown in FIG. 3 of the accompanying drawings, an annular retainer 7 made of a highly rigid material such as a steel plate for retaining, for example, gourd-shaped sprags 3a, a ribbon spring for biasing the sprags in an engagement (meshing) direction, etc. are disposed between an outer race 1 and an inner race 2, and bearings 8 are disposed on the opposite sides thereof and have charge of the radial load during the aligning and idle rotation of the inner and outer races. Also, in a construction shown in FIG. 4 of the accompanying drawings, end bearings 9 are disposed on the opposite sides of the sprags 3a and retainer 7.

As described above, the one-way clutch according to the prior art has the highly rigid retainer comprising a steel plate, bearings, etc. Therefore is heavy despite the modest number of sprags, and it requires substantial axial mounting space. It also suffers from the disadvantage of high cost, and it has been difficult to use such one-way clutch in reduction gears for a vehicle having a strict weight limit or in compact gear reduction gears haveing a strict space limit. Further, there has been the problem that when the mounting width of the one-way clutch is small, the length of the sprag is limited by the bearings on the opposite sides thereof so that the capacity of the one-way clutch is limited.

There has been devised a one-way clutch comprising cam type sprags, a retainer of the single gauge type in which a resilient wire material is formed in a U-shaped zigzag fashion, annular side plates, etc. and constructed compactly (see, for example, Japanese Patent Publication No. 63-31011). The construction is shown in FIGS. 5 to 9 of the accompanying drawings. As shown in FIG. 5, cam type sprags 3, a retainer 25 in which a resilient wire material is formed in a U-shaped zigzag fashion, a garter spring 5, annular side plates 20, etc. are disposed between an outer race 1 and an inner race 2.

FIG. 7 is a front view of the cam type sprag 3, and FIG. 8 is a side view of the sprag 3 of FIG. 7 as it is seen in the direction of arrow F. The sprag 3 has a groove 31 into which the garter spring is inserted, a cam curved surface 32 and an arcuate surface 33. The reference numeral 34 designates the bottom surface of the groove 31. FIG. 9 is a perspective view of the annular side plate 20 fitted to the opposite sides of the sprag. In FIG. 9, the reference numeral 21 denotes outer race sliding pieces frictionally sliding on the outer race, the reference numeral 22 designates inner race sliding pieces frictionally sliding on the inner race, the reference numeral 23 denotes recesses into which the wire retainer 25 is fitted, and the reference numeral 24 designates an annular plate portion.

FIG. 6 shows the cross-section VI—VI of FIG. 5, and in this figure, there is shown a state in which the sprags 3, the retainer 25, the garter spring 5 and the left and right annular side plates 20 are combined together. The reference numeral 26 denotes an axial movement stopping member.

With such a construction, the concentricity of the inner and outer races is maintained by the outer race sliding pieces 21 and inner race sliding pieces 22 bent from the annular plate portion 24 of the annular side plate 20, and the annular side plate 20 has charge of the radial load during idle rotation. Since the axial lengths of the other parts than the sprags are only the thickness of the annular side plate 20 and the diameter of the retainer 25, there can be provided a compact one-way clutch in which the axial space requirement is. However, there is the disadvantage that the number of parts is unavoidably great.

If for example, the number of the sprags is reduced to decrease the number of parts in such a one-way clutch, the guiding property of the spring will become bad because the grooves in the sprags constitute the guide of the garter spring. Thus it will become difficult to keep the entire spring in a circular state and as a result, a sufficient biasing force in a meshing direction acting on the sprags will become unobtainable and there will arise the problem that the durability of the spring is spoiled.

Therefore it has been conceived to improve the retainer of the sprags to thereby provide an annular retainer. FIG. 10 of the accompanying drawings is an axial front view, of a construction having such a retainer and FIG. 11 of the accompanying drawings is a cross-sectional view taken along the line XI—XI of FIG. 10. In these figures, the reference numeral 1 designates an outer race, the reference numeral 2 denotes an inner race, the reference numeral 3 designates cam type sprags (identical to those shown in FIGS. 7 and 8), the reference numeral 5 denotes a garter spring, and the reference numeral 6 designates an annular retainer. The sprags 3 are fitted in windows 63 of the retainer 6. The retainer comprises a cylindrical flange portion 61 and an annular flange portion 62, and the windows are formed in the cylindrical flange portion 61. The garter spring 5 inserted in the grooves of the sprags is guided and held by the cylindrical flange portion 61 of the retainer 6 and therefore, even if the number of the sprags is decreased as shown in FIG. 10, the garter spring is held by the outer peripheral portion of the flange portion 61 and maintains a circular state. Thus, the one-way clutch 10 can secure a reliable meshing state.

However, such a retainer alone cannot sufficiently fulfill the bearing function taking charge of radial load.

SUMMARY OF THE INVENTION

It is an object of the present invention to solve the above-noted problems and to provide a one-way clutch comprising an outer race and an inner race radially spaced apart from each other and concentrically disposed for rotation relative to each other, the outer race having an inner peripheral raceway surface, the inner race being disposed within the outer race and having an annular outer peripheral raceway surface, a plurality of cam type sprags disposed between the outer race and the inner race for transmitting a torque between the outer peripheral raceway surface and the inner peripheral raceway surface, an annular retainer for retaining the sprags, and a spring member for sandwiching the sprags between itself and the retainer and biasing the sprags in a meshing direction, wherein provision is made of bearings disposed in a circumferential direction among the cam type sprags and frictionally sliding on the inner peripheral surface of the outer race and the outer peripheral surface of the inner race.

DESCRIPTION OF THE PREFERRED EMBODIMENTS

Figure 1:
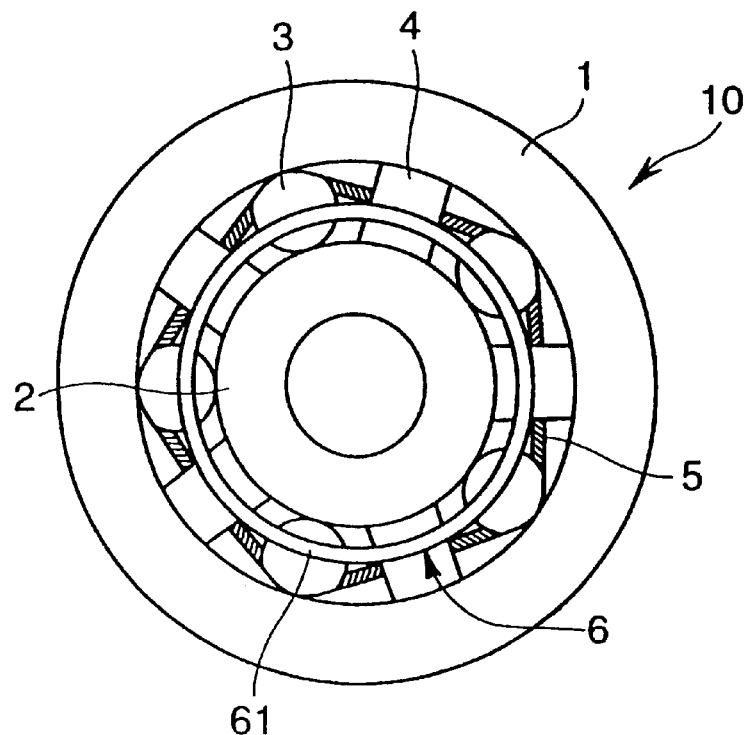
FIG. 1 is an axial front view of the one-way clutch of the present invention.
Figure 10:
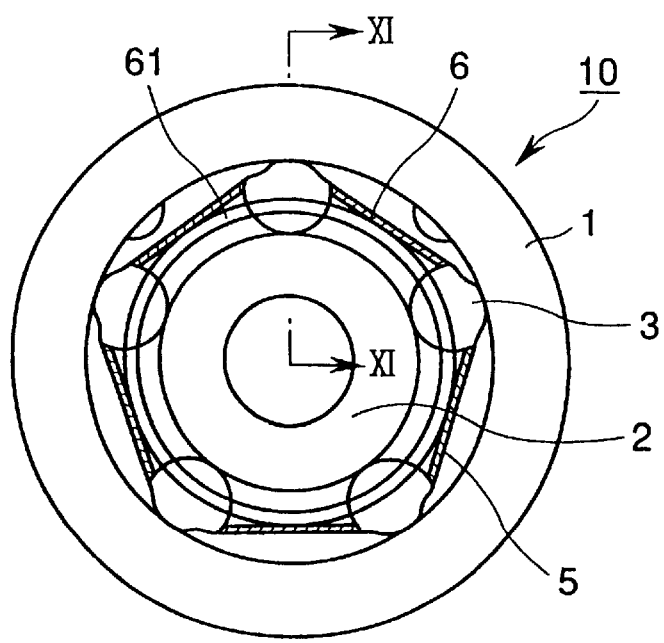
FIG. 10 is an axial front view of a further improved one-way clutch.
Figure 11:
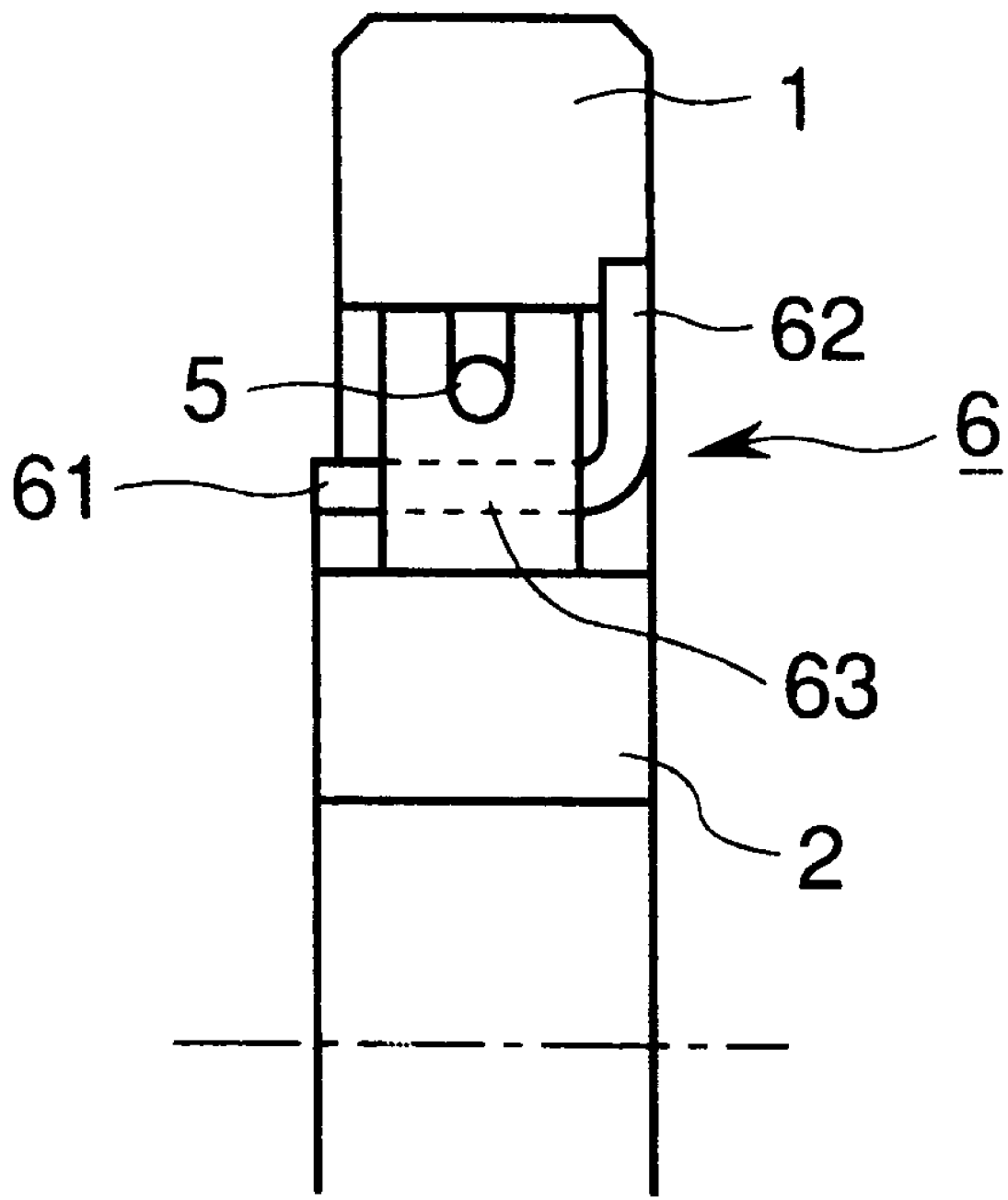
FIG. 11 is a cross-sectional view taken along the line XI—XI of FIG. 10.

FIG. 1 is an axial front view of a one-way clutch 10 (similar to that which is shown in FIGS. 10 and 11) having cam type sprags constructed in accordance with the present invention. The reference numeral 1 designates an outer race, the reference numeral 2 denotes an inner race, and the reference numeral 3 designates cam type sprags meshing with the inner peripheral surface of the outer race 1 and the outer peripheral surface of the inner race 2 to thereby, transmit a torque between the two races. The reference numeral 5 denotes a garter spring for giving the sprags 3 a moment for meshing, the reference numeral 6 designates an annular retainer for retaining the sprags 3, and the reference numeral 61 denotes the cylindrical flange portion of the retainer. A one-way clutch of the single gauge type having only one retainer 6 cannot receive a load in a radial direction and therefore, in the present invention, block bearings 4 are disposed as bearings among the sprags 3 so as to receive the radial load during the alignment and idle rotation of the inner and outer races. The sprags 3 each have a circumferential groove as in the prior art, and the garter spring is fitted in the groove.

Figure 2A:
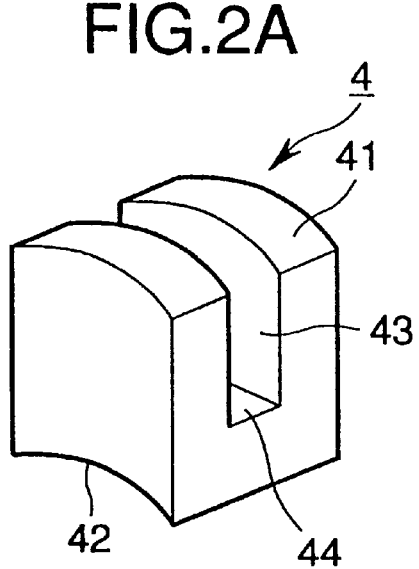
FIGS. 2A and 2B are perspective views of a block bearing used in the one-way clutch of FIG. 1.
Figure 2B:
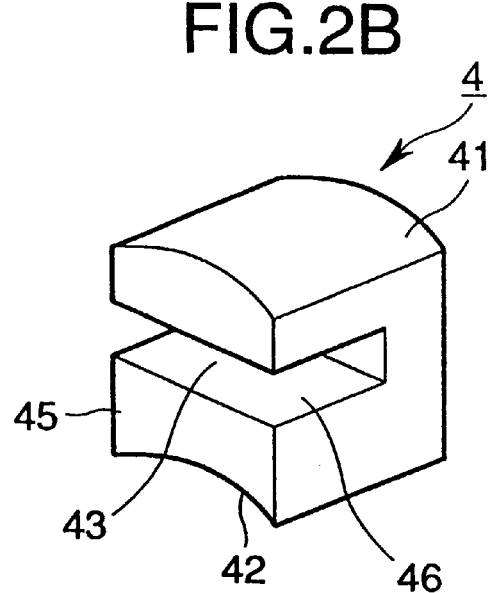
Figure 3:
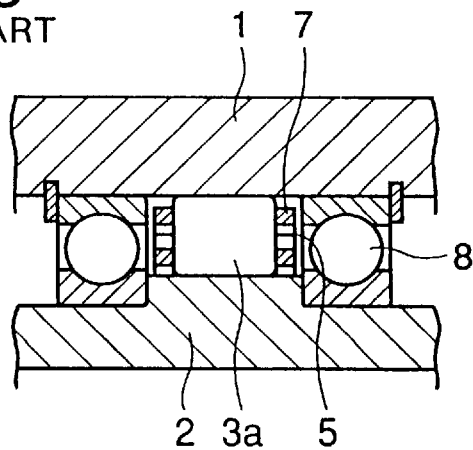
FIG. 3 is an axial front view of a one-way clutch according to the prior art.
Figure 4:
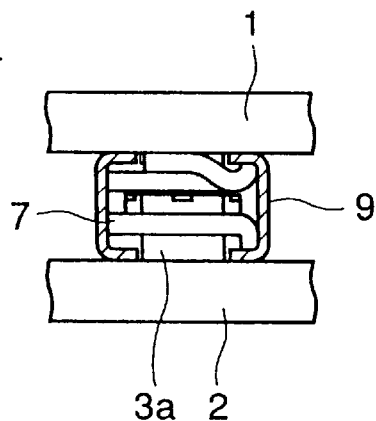
FIG. 4 is an axial front view of a one-way clutch according to another example of the prior art.
Figure 5:
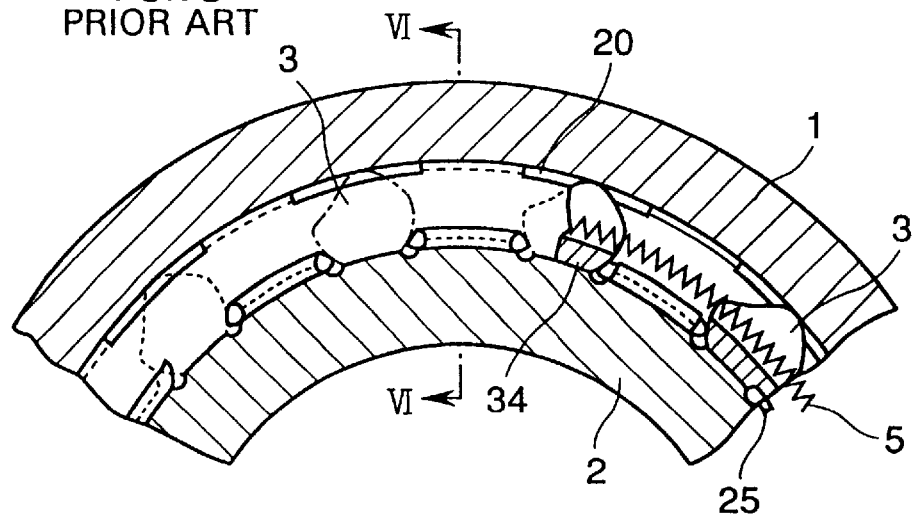
FIG. 5 is an axial front view of an improved one-way clutch.
Figure 6:
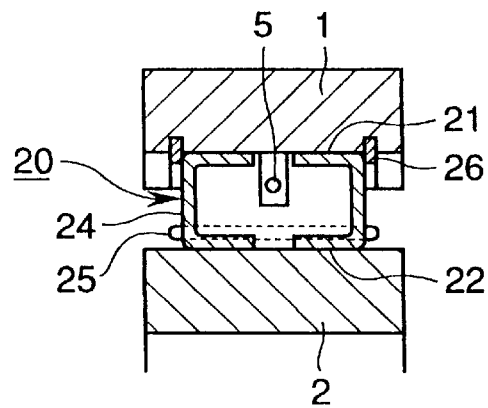
FIG. 6 is a cross-sectional view taken along the line VI—VI of FIG. 5.
Figure 7:
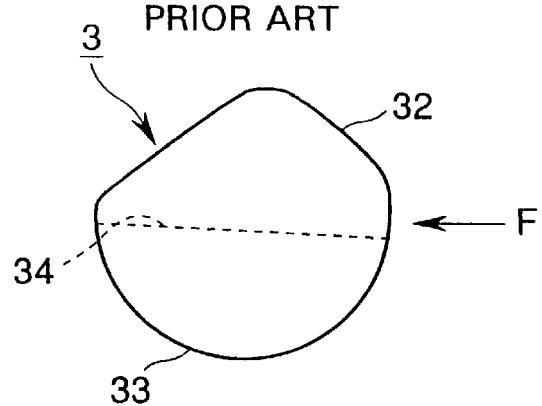
FIG. 7 is a front view of a cam type sprag.
Figure 8:
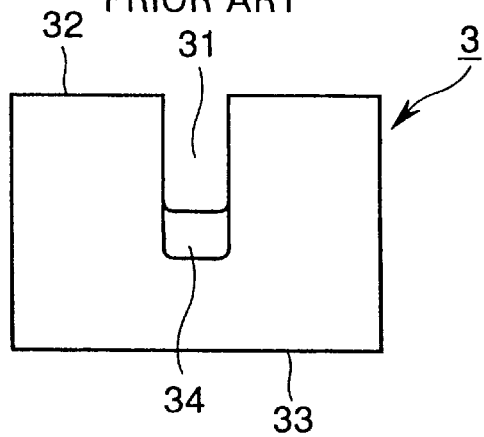
FIG. 8 is a side view of the sprag of FIG. 7 as it is seen in the direction of arrow F.
Figure 9:
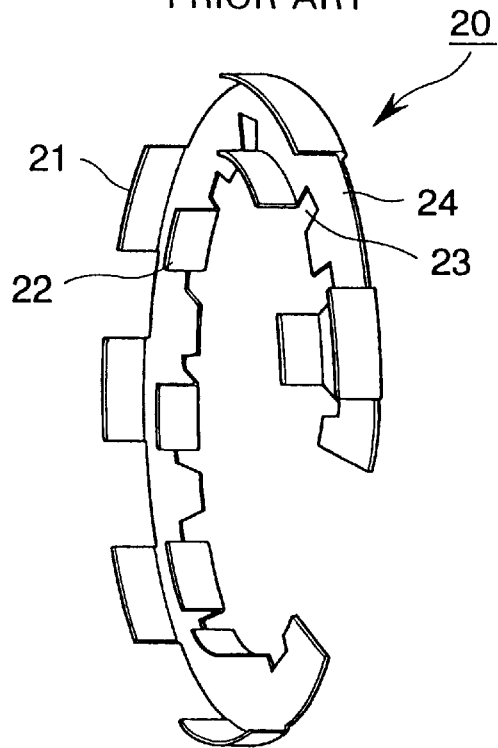
FIG. 9 is a perspective view of an annular side plate.

FIG. 2A is a perspective view of an example of the block bearing 4, and FIG. 2B is a perspective view of another example of the block bearing 4.

In FIG. 2A, the block bearing 4 has a curved frictionally sliding surface 41 for frictionally sliding on the inner peripheral surface of the outer race 1, a curved frictionally sliding surface 42 for frictionally sliding on the outer peripheral surface of the inner race 2, and a groove 43 for guiding and holding the garter spring 5. It is preferable that the frictionally sliding surface 41 be a curved surface having substantially the same curvature as that of the inner peripheral surface of the outer race 1. Also, it is preferable that the frictionally sliding surface 42 be a curved surface having substantially the same curvature as that of the outer peripheral surface of the inner race 2. Further, the groove 43 is provided with a bottom surface 44 for guiding the garter spring 5 and extends in a circumferential direction. This bottom surface 44 may be made into a flat surface or a curved surface having a curvature similar to that of the frictionally sliding surface 41. Also, the groove 43 is formed so as to open in the frictionally sliding surface 41 and extend from the frictionally sliding surface 41 toward the frictionally sliding surface 42, that is, to have a predetermined depth in a radial direction.

FIG. 2B is a perspective view of the block bearing 4 showing a groove 43 according to another example. In this example, the construction of the frictionally sliding surfaces 41 and 42 is the same as that of the example of FIG. 2A, but the groove 43 is formed so as to open not in the frictionally sliding surface 41 but in a flat side surface 45 connecting the frictionally sliding surfaces 41 and 42 together and extends from the side surface 45 toward a side surface opposed thereto, that is, to have a predetermined depth in an axial direction. In this example, the inner side surface 46 of the groove 43 guides the garter spring 5. The inner side surface 46 may be a flat surface, but can also be made into a curved surface having a curvature similar to that of the frictionally sliding surface 41.

As shown in FIG. 1, in the one-way clutch 10 of the present invention, the cam type sprags 3 are retained by the annular retainer having the cylindrical flange portion 61; and therefore, the garter spring 5 is guided and held by the outer peripheral surface of the cylindrical flange portion 61. Therefore, even if the number of the sprags 3 is decreased in conformity with the desired capacity of the one-way clutch 10, the circularity of the spring can be kept, and further the radial load during the alignment and idle rotation of the inner and outer races can be received by the block bearings 4. The garter spring 5 sandwiches the sprags 3 between itself and the retainer 6 and biases them in a meshing direction.

FIG. 1 shows a one-way clutch assembled with the block bearing 4 as shown in FIG. 2A.

The one-way clutch of the present invention described above permits the number of the sprags to be increased or decreased as required, and can do without the bearings on the opposite sides of each sprag for receiving the radial load during the alignment and idle rotation of the inner and outer races, decreasing the axial dimension and thereby providing a compact assembly.

What is claimed is:

1. A one-way clutch comprising:
    an outer race and an inner race radially spaced apart from each other and concentrically disposed for rotation relative to each other, the outer race having an inner peripheral raceway surface, the inner race being disposed within said outer race and having an annular outer peripheral raceway surface;
    a plurality of cam type sprags disposed between said outer race and said inner race to transmit torque between said outer peripheral raceway surface and said inner peripheral raceway surface;
    an annular retainer retaining said sprags, said retainer being provided with a cylindrical portion having window portions extending in a radial direction, said sprags being pivotally fitted in said window portions;
    a spring member sandwiching said sprags between itself and said retainer and biasing said sprags in a meshing direction, said spring member being substantially circularly guided by an outer peripheral surface of said cylindrical portion of said retainer; and
    bearings disposed in a circumferential direction among said cam type sprags and frictionally sliding on the inner peripheral surface of said outer race and the outer peripheral surface of said inner race.

2. A one-way clutch according to claim 1, wherein said bearings each has a groove extending in a circumferential direction in which said spring member is fitted.

3. A one-way clutch according to claim 2, wherein said grooves are formed in a radial direction.

4. A one-way clutch according to claim 2, wherein said grooves are formed in an axial direction.

5. A one-way clutch comprising:

an outer race and an inner race radially spaced apart from each other and concentrically disposed for rotation relative to each other, the outer race having an inner peripheral raceway surface, the inner race being disposed within said outer race and having an annular outer peripheral raceway surface;

a plurality of cam type sprags disposed between said outer race and said inner race to transmit torque between said outer peripheral raceway surface and said inner peripheral raceway surface;

an annular retainer retaining said sprags;

a spring member sandwiching said sprags between itself and said retainer and biasing said sprags in a meshing direction; and bearings disposed in a circumferential direction among said cam type sprags and frictionally sliding on the inner peripheral surface of said outer race and the outer peripheral surface of said inner race, each of said bearings having a groove extending in a circumferential direction and in which said spring is fitted, said groove being formed in an axial direction.

* * * * *